United States Patent
Cahill et al.

(10) Patent No.: US 9,818,427 B2
(45) Date of Patent: Nov. 14, 2017

(54) AUTOMATIC SELF-UTTERANCE REMOVAL FROM MULTIMEDIA FILES

(71) Applicant: Intel Corporation, Santa Clara, CA (US)

(72) Inventors: Niall Cahill, Galway (IE); Jakub Wenus, Maynooth (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 14/977,911

(22) Filed: Dec. 22, 2015

(65) Prior Publication Data

US 2017/0178661 A1  Jun. 22, 2017

(51) Int. Cl.
| | |
|---|---|
| G10L 21/028 | (2013.01) |
| G10L 25/78 | (2013.01) |
| G10L 25/51 | (2013.01) |
| G10L 15/06 | (2013.01) |
| H04W 88/02 | (2009.01) |

(52) U.S. Cl.
CPC .......... G10L 21/028 (2013.01); G10L 15/063 (2013.01); G10L 25/51 (2013.01); G10L 25/78 (2013.01); H04W 88/02 (2013.01)

(58) Field of Classification Search
CPC ....... G10L 2021/02087; G10L 21/0272; G10L 21/028
See application file for complete search history.

(56) References Cited

U.S. PATENT DOCUMENTS

| | | | |
|---|---|---|---|
| 8,219,390 B1* | 7/2012 | Laroche | G10L 21/0272 704/207 |
| 2006/0067541 A1* | 3/2006 | Yamada | G10H 1/361 381/98 |
| 2010/0280827 A1* | 11/2010 | Mukerjee | G10L 15/142 704/236 |
| 2011/0046952 A1* | 2/2011 | Koshinaka | G10L 15/063 704/243 |
| 2011/0194709 A1* | 8/2011 | Ozerov | G10L 21/0272 381/119 |
| 2012/0046940 A1* | 2/2012 | Tsujikawa | G10L 21/0272 704/200 |
| 2012/0082323 A1* | 4/2012 | Sato | G10L 21/0272 381/94.3 |
| 2013/0121511 A1* | 5/2013 | Smaragdis | G10L 25/48 381/119 |
| 2014/0172426 A1* | 6/2014 | Aratsu | G10L 21/0208 704/235 |
| 2014/0278397 A1* | 9/2014 | Chen | G10L 21/02 704/233 |

(Continued)

*Primary Examiner* — Douglas Godbold
(74) *Attorney, Agent, or Firm* — Schwegman Lundberg & Woessner, P.A.

(57) ABSTRACT

Embodiments of a system and method for removing speech by a user from audio frames are generally described herein. A method may include receiving a plurality of frames of audio data, extracting a set of frames of the plurality of frames, the set of frames including speech by a user with a set of remaining frames in the plurality of frames not in the set of frames, suppressing the speech by the user from the set of frames using a trained model to create a speech-suppressed set of frames, and recompiling the plurality of frames using the speech-suppressed set of frames and the set of remaining frames.

19 Claims, 5 Drawing Sheets

(56) References Cited

U.S. PATENT DOCUMENTS

| | | | |
|---|---|---|---|
| 2015/0111615 A1* | 4/2015 | Chu | H04M 3/2236 455/563 |
| 2015/0208171 A1* | 7/2015 | Funakoshi | H04S 7/30 381/26 |
| 2015/0235651 A1* | 8/2015 | Sharifi | G10L 15/20 704/233 |
| 2015/0256955 A1* | 9/2015 | Hwang | H04R 29/004 381/56 |
| 2015/0302863 A1* | 10/2015 | Dacosta | G10L 21/0208 348/14.08 |
| 2015/0317977 A1* | 11/2015 | Manjunath | G10L 25/48 704/270 |
| 2015/0332680 A1* | 11/2015 | Crockett | G10L 19/008 381/23 |
| 2015/0371645 A1* | 12/2015 | Seo, II | G10L 19/008 381/22 |
| 2016/0005394 A1* | 1/2016 | Hiroe | G10L 15/04 704/248 |
| 2016/0099008 A1* | 4/2016 | Barker | H04R 25/505 704/233 |
| 2016/0283469 A1* | 9/2016 | Gold | G06F 17/289 |
| 2016/0329063 A1* | 11/2016 | Wige | G06F 3/162 |

\* cited by examiner

AUTOMATIC SELF-UTTERANCE REMOVAL FROM MULTIMEDIA FILES

BACKGROUND

The ability to capture multimedia recordings is a key capability of smartphones and other mobile devices. This ability has been a key driver of recent smartphone/tablet adoption, and it is predicted to be a key driver going forward. The importance of this capability has motivated numerous multimedia capture technological enhancements to improve the experience of the smartphone user; indeed, such innovations are often employed as key differentiators for smartphones.

Multimedia recordings via smartphones often contain speech utterances from a user that is capturing the recording (i.e., self-utterances). An increasingly common complaint of smartphone/tablet users is the undesired prominence that these self-utterances have on the audio of multimedia recordings. This prominence is due to the user's close proximity to the microphone when the user is capturing a recording. For many users, self-utterances spoil the resulting multimedia recording. The current systems do not allow a user to automatically suppress self-utterances from multimedia recordings.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
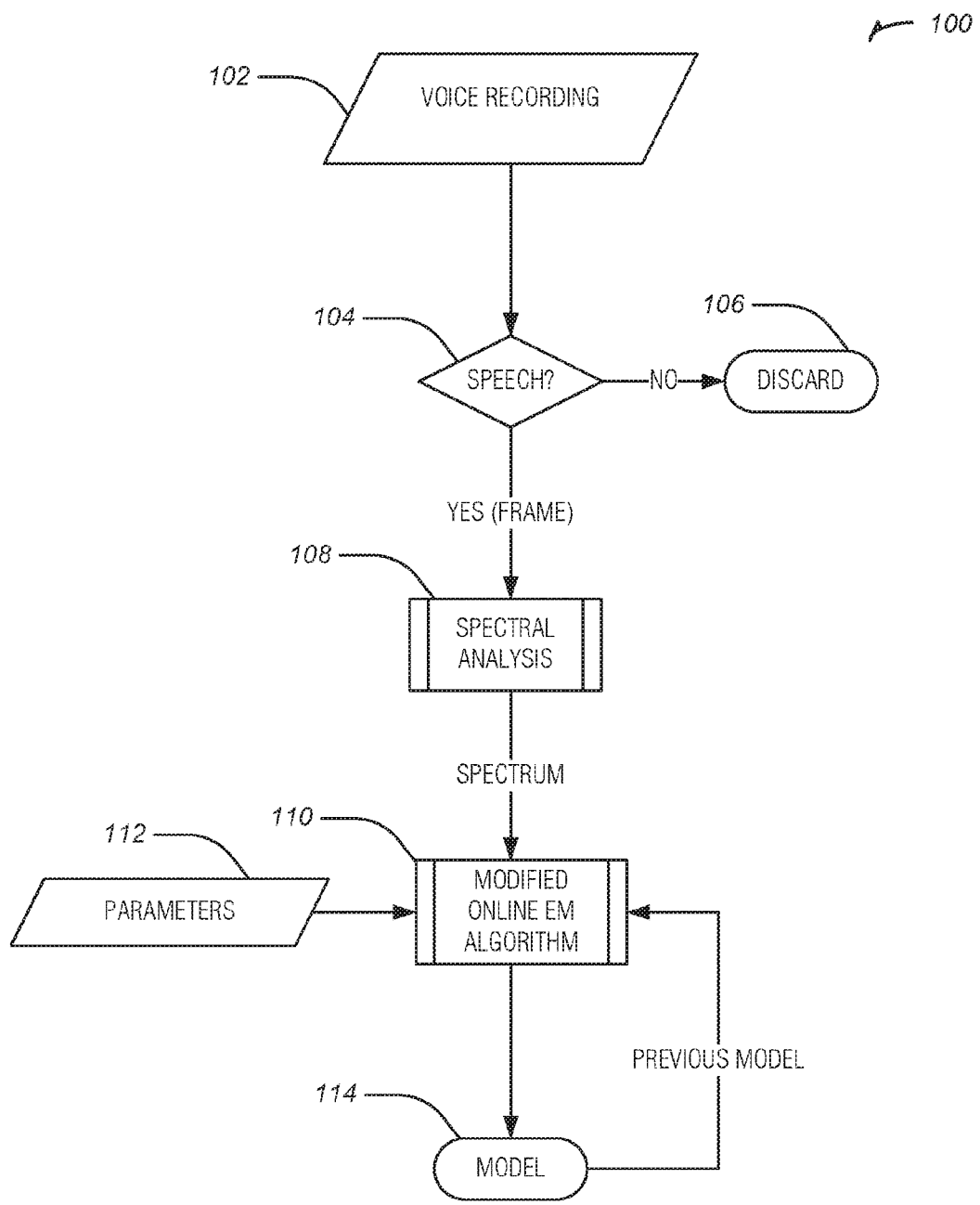
FIG. 1 illustrates a block diagram of a machine learning process for modeling user speech in accordance with some embodiments.

The systems and methods described below use a novel technique to automatically identify and suppress a user's speech from the audio of a multimedia recording. The technique encompasses a model of human speech that is adapted online to the user's speech, such as during telephone conversations. In an example, the model is then employed offline to identify self-utterances in multimedia files such that they may be suppressed (e.g., removed or attenuated). The technique presents this enhancement to a user as an option in any suitably enabled multimedia capture or display application. The user may select to apply the enhancement to particular multimedia file(s) that are deemed to contain undesired self-utterances. In an example, the application may run on a smartphone, tablet, desktop, etc.

An example technique uses a modified, online, implementation of an Expectation Maximization (EM) algorithm to learn a Gaussian Scale Mixture Model (GSMM) of a user's speech during telephone conversations. The example technique then may employ this model offline to detect the presence of the user's speech in a multimedia recording, such as a video file, a recording containing audio only, or the like. The technique may suppress the user's speech from the recordings, thus enhancing the recording for the user using the model.

Typically, removing self-utterances from multimedia recordings is a manual task involving audio editing. Because the manual task is difficult, generally, the process of editing audio has been the purview of professional audio engineers who employ their extensive knowledge of acoustics, and complex audio editing software (e.g., expensive closed source applications) to enable this process. Using the techniques described herein, a user may automatically suppress self-utterances from multimedia files without possessing either expensive audio editing software or acoustic expertise.

Existing speech enhancement technologies, such as those based on spatial filtering by microphones arrays, may also be used with the techniques herein. Existing speech enhancement technologies may be deployed during capture of a multimedia file to block self-utterances from the recording in an online manner. For instance, in the microphone array context, the microphone array may be configured to filter acoustic signals arriving from the direction of the user. However, microphone arrays are limited in performance due to constraints on the number of microphones and processing (e.g., the existing speech enhancement technologies may require online access). In addition, the geometry between the user's mouth and the microphone may vary significantly during a video capture. Further, microphone arrays do not exploit the speech data that is available from the user.

The techniques described herein perform single microphone sound source separation, (i.e., the separation of sound sources from a single mixture). This approach uses knowledge of the sound sources that are present in a mixture to perform separation. This knowledge may be in the form of representative sample data from each of the sound sources. Various customized machine learning techniques may be employed to learn a model of each sound source from the spectrogram of sample data. These trained models may then be used to identify and capture the contribution of each sound source to a mixture, allowing an estimate of the original sources to be obtained. This approach may be used to suppress self-utterances.

FIG. 1 illustrates a block diagram 100 of a machine learning process for modeling user speech in accordance with some embodiments. The machine learning process may include an online process to leverage availability of a user's speech on a mobile device during a telephone conversation to learn a model of the user's speech. This process may operate on a frame-by-frame basis, with the frame size and other parameters matching that of the speech codec. This matching may be used to exploit the processing performed by the mobile device. The mobile device may be any type of mobile compute device including, but not limited to a mobile phone, a smartphone, a phablet, a tablet, a personal digital assistant (PDA), a mobile telephone, wearable device (e.g., smartwatch, smartglasses, e-textile, etc.), an Ultrabook, a laptop, or any machine capable of executing instructions (sequential or otherwise) that specify actions to be taken by that machine.

In an example, the process may start with a voice recording 102, such as a telephone conversation (e.g., recorded or live), recorded audio, recorded video with audio components, or the like. The voice recording 102 may be analyzed for speech at decision block 104. Frames containing non-voice audio, including silence, may be detected and discarded for purposes of the learning process at block 106. Frames that include speech may be subjected to further analysis, such as on a frame-by-frame analysis. An incoming frame of speech may be submitted to a learning procedure by which the spectrum of the incoming frame is fitted to a model at spectral analysis block 108. In an example, contiguous frames may be buffered so that the learning is performed over a wider temporal extent. The user speech frames may be modeled, such as by using a Gaussian Scale Mixture Model (GSMM). A learning algorithm to optimize the parameters of this model may include a modified, online version of an Expectation Maximization (EM) algorithm at block 110. Parameters may be introduced to the modified online EM algorithm from block 112. The various parameters of the learning algorithm and the model, such as the number of Gaussians and the forgetting factor for the online algorithm, may be optimized for speech captured on resource constrained mobile devices. The learning procedure may be scheduled to stall when the learning rate of the EM algorithm stabilizes, which is a tactic that may be used to preserve battery life in energy constrained devices, such as mobile devices. The block 110 outputs a trained model 114 (e.g., a GSMM) of the user's speech that may be used by enhancement techniques described below. The model 114 may be used in an iterative manner to update and improve the modified online EM algorithm at block 110.

In an example, during a telephone conversation (e.g., on a handheld device such) audio frames may be streamed into the learning process at block 102. The frames enter a voice activity detector, which discards frames that do not contain speech. Frames with human speech are propagated to spectral analysis (block 108). Block 108 is used to obtain a spectrum of a user's speech frame. This part of the process may leverage the processing performed by the speech codec. The spectrum is sent to the next block 110. The block 110 fits the spectrum to a model. For example, the block 110 may decompose the spectrum onto a GSMM model using an EM algorithm. The EM algorithm may be implemented in an online manner. The GSMM model may be recursively adapted to a frame, whereby the effect of previous frames may be preserved by specifying a forgetting factor. In an example, a forgetting factor may include a number of frames, such as 3, 10, 50, etc. A forgetting factor may include a weighting for previous frames, such that the effect goes down over time. This block 110 may accept parameters 112 for the model and the learning algorithm, which may be obtained offline. The updated model 114 may be saved for the next frame. A range of matrix decomposition or soft clustering techniques, other than the GSMM approach, may be used to perform the decomposition. Examples of other techniques may include Nonnegative Matrix Factorization, Principle Component Analysis, Independent Subspace Analysis, or Sparse Non-Negative Matrix Factorization.

Figure 2:
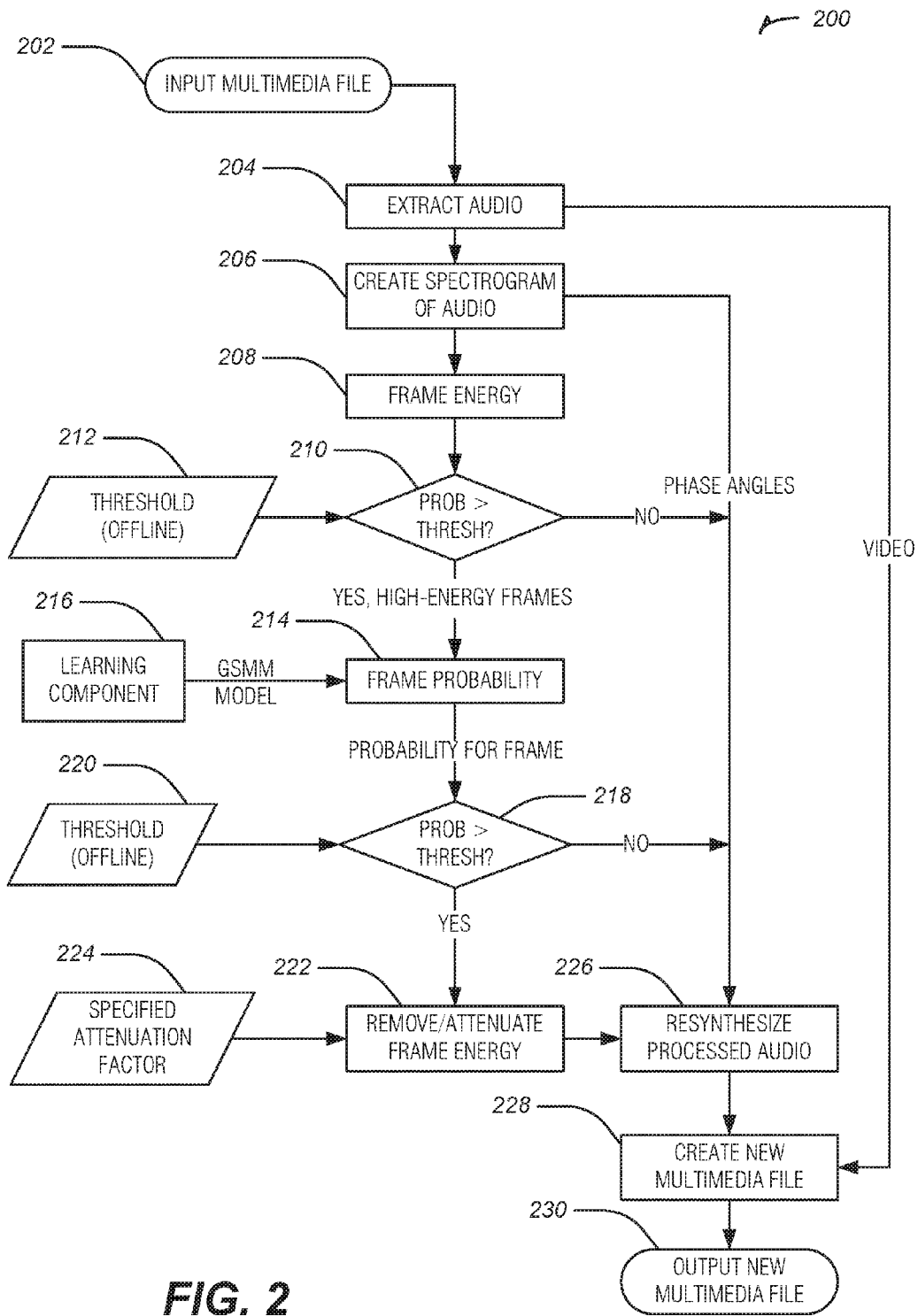
FIG. 2 illustrates a block diagram of a multimedia enhancement process for removing speech in accordance with some embodiments.

FIG. 2 illustrates a block diagram 200 of a multimedia enhancement process for removing speech in accordance with some embodiments. In an example, the multimedia enhancement process includes an offline process that suppresses prominent utterances of the user's speech from selected multimedia recordings. The enhancement process may be initiated by receiving a selection of a multimedia recording, such as a multimedia recording that includes undesired self-utterances. The multimedia file may be input to the process at block 202. Audio from the multimedia file may be extracted at block 204. Video or other components from the multimedia files may be sent to block 228 to be used to create a new multimedia file. After the audio is extracted at block 204, the audio may be sent to block 206 to create a spectrogram of the audio. Similar to the learning process described above, the enhancement process may operate on spectrogram of audio of a recording. The spectrogram may be input to a detection module at block 208, which may use the energy in a frame as a metric to detect whether the audio frame is prominent, such as an audio frame with high energy. A threshold for this detector may be set offline or predetermined at block 212. The threshold may be used at block 210 to determine whether the probability is greater than the threshold. If not, the audio or frame may be passed to block 226 to resynthesize the processed audio. If it is, then the detected frames may be passed to a classification block 214, which may classify whether a frame includes user audio.

To classify each frame the block 214 may determine the probability that the frame was uttered by the user, and compare this probability to a threshold. The probability may be determined by first submitting the frame to a Gaussian or a plurality of Gaussians of the users learned GSMM model (e.g., as obtained from the learning component at block 216, or from the model determined in FIG. 1). The block 214 outputs a set of probabilities for the frame. At block 220 a threshold may be sent to block 218, which may determine a point value for the probability by taking the expected value over the set of probabilities. This point value may be compared to the threshold to determine if the frame includes user speech. If not, the frame may be sent to block 226 to resynthesize the processed audio. If so, the frame may be sent to block 222 to remove or attenuate the frame energy, such as to suppress the audio of the user. In an example, the probability and threshold at block 210 differ from the probability and threshold at block 218. For example, the probability and threshold at block 210 are used to determine whether the frame energy for a frame indicates a high-energy frame. Block 210 uses a threshold 212 for frame energy. The probability and threshold at block 218 are used to determine whether the high-energy frame includes speech by a user. Different probability functions and different thresholds may be used at blocks 210 and 218 to determine if high-energy frames or frames with user speech are present.

Similar to the energy detector threshold, the value of the classification threshold may be selected offline using standard techniques, such as the Receiver Operating Curve (ROC) approach, with training data. A frame including speech by a user may be attenuated or removed entirely depending on the user's preferences or other predetermined factors. A specified attenuation factor 224 may be used to remove or attenuate the frame energy at block 222. The output of the block 222 includes the frame without the speech audio from the user. The output is sent to block 226, which may resynthesize the processed audio, along with other frames of audio that do not include speech, such as outputs of either of the probability/threshold comparisons, or the spectrogram at block 206, which may send phase angles to block 226. The resynthesized audio may be sent to block 228 to create a new multimedia file, the new multimedia file including the resynthesized processed audio from block 226 and the video or other multimedia components from block 204. Block 228 may create a multimedia file with self-utterances removed or attenuated, and output the file at block 230.

In an example, a user may be prompted via a user interface to type or select a path to a multimedia file to suppress self-utterances. An application may separate video and audio in the multimedia file. The application may send the audio to the next stage of the application. The phase angles of the audio may be kept to resynthesize the processed audio output. The video may be kept to construct the output multimedia file. A pure audio file may also be processed by this system. A spectrogram of the audio may be generated. The audio frames are detected that contain a large amount of energy, so-called prominent frames. The detector may compute the energy in each frame and compare the energy to a threshold that is supplied to the application. Certain audio may be excluded when desired to be preserved in the multimedia file. The classification aspect of the application may compute the probability that the high-energy frame was uttered by the user; this probability may be subsequently compared to a threshold. The probability may be determined by first submitting each detected frame to each Gaussian of the user's learned model, such as the GSMM model obtained from the learning technique used in FIG. 1. The probability determination may result in a set of probabilities for this frame, which may be used to determine a point value by taking the expected value over this set of probabilities. The point value may be compared to a threshold, if it exceeds the threshold the frame is considered to include user uttered speech. The frame energy may be attenuated or removed after the comparison. The user may modulate the level of attenuation. In an example, a default attenuation includes 30 dB attenuation of the frame. A time domain waveform of the current frame may be synthesized using the phase angles from above. The waveform of the processed speech may be paired with the video from above, and the resulting data may be formatted using a specified file format, such as the original file format. The output of this application includes a processed multimedia file.

Figure 3:
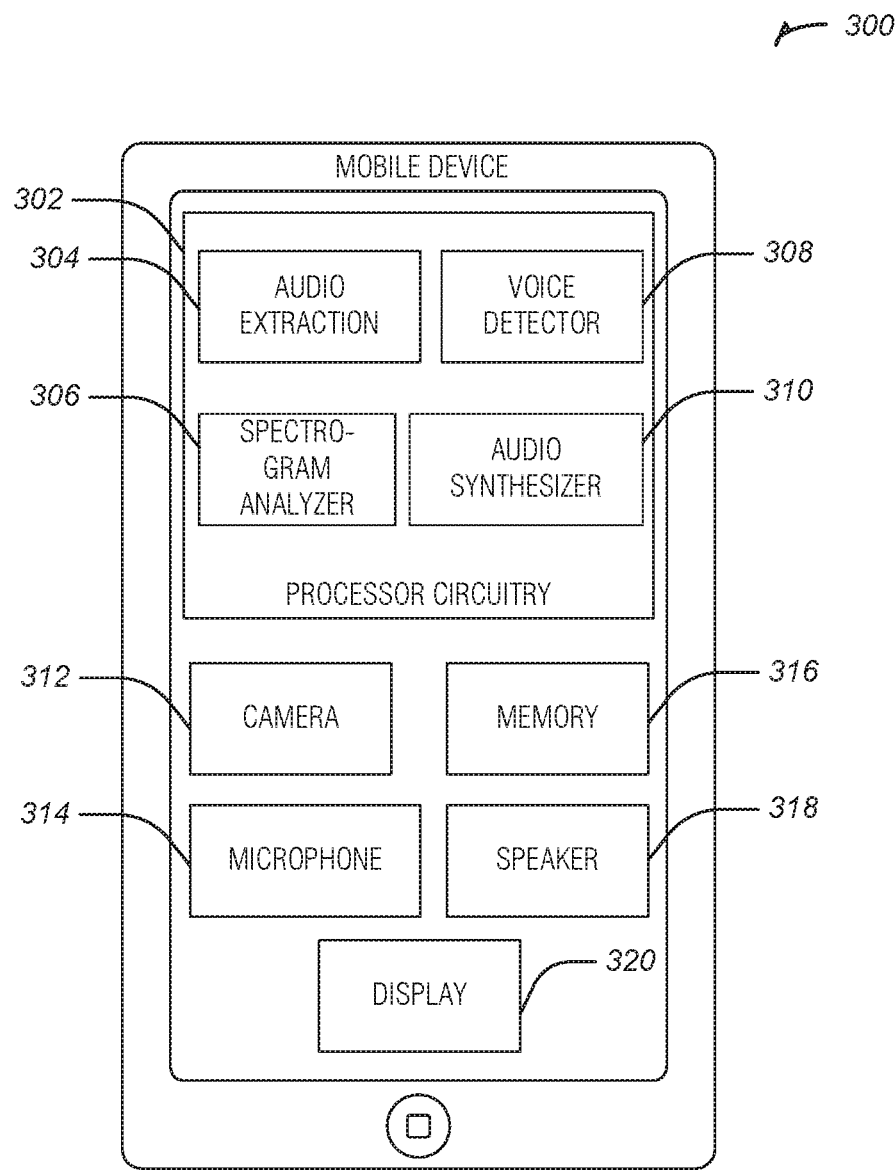
FIG. 3 illustrates an example of a mobile device for removing speech from a multimedia file in accordance with some embodiments.

FIG. 3 illustrates an example of a mobile device 300 for removing speech from a multimedia file in accordance with some embodiments. The mobile device 300 includes processor circuitry 302, including audio extraction circuitry 304, spectrogram analyzer circuitry 306, voice detector circuitry 308, and audio synthesizer circuitry 310. In an example, the mobile device 300 includes a camera 312, a microphone 314, memory 316, a speaker 318, and a display 320. The mobile device 300 may be used to perform the extraction of user-utterances from a multimedia file, as described above in regard to FIG. 2. The mobile device 300 may be used for a telephone call to train the model of FIG. 1.

In an example, the microphone 314 may be used to record audio and the camera 312 may be used to record video. For example, the video and audio recorded by the microphone 314 and the camera 312 may be combined to create a multimedia file. The multimedia file may be saved to the memory 316. The multimedia file may be analyzed for user speech according to the process described in FIG. 2, and compared to a learned model according to the process described in FIG. 1. The multimedia file may be analyzed by the audio extraction circuitry 304 to extract the audio from the multimedia file. The spectrogram analyzer circuitry 306 may determine a spectrogram for the audio and analyze the spectrogram for high energy frames. The frames may be sent to the voice detector circuitry 308 to determine if the frames include user speech. The voice detector circuitry 308 may suppress the user speech and send the frames with the speech suppressed to the audio synthesizer circuitry 310. The audio synthesizer circuitry 310 may reconstitute the frames of audio with the speech suppressed and the frames without suppressed speech. The audio synthesizer circuitry 310 may also reconstitute the audio with the video or other components to create a new multimedia file, corresponding to the initial multimedia file captured by the camera or microphone. The new multimedia file may be played by the speaker 318 or display 320 of the mobile device 300.

Figure 4:
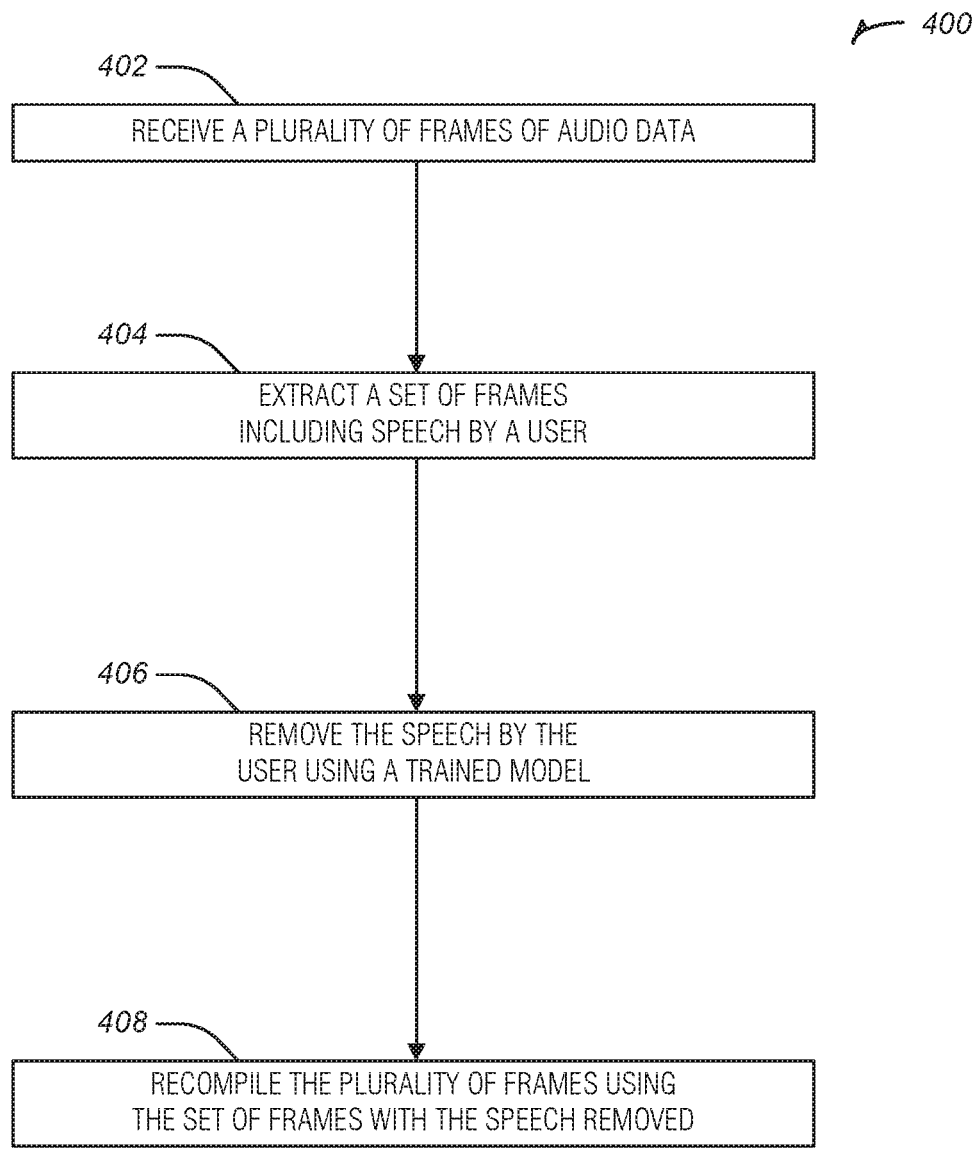
FIG. 4 illustrates a flowchart showing a technique for removing speech from a multimedia file in accordance with some embodiments.

FIG. 4 illustrates a flowchart showing a technique 400 for removing speech from a multimedia file in accordance with some embodiments. The technique 400 includes an operation 402 to receive a plurality of frames of audio data. The plurality of frames may include one or more frames with speech by a user. The technique 400 includes an operation 404 to extract a set of frames including speech by a user. The technique 400 may set aside remaining frames in the plurality of frames that do not include speech by the user. The technique 400 includes an operation 406 to suppress the speech by the user using a trained model. The trained model may include a GSMM model. The GSMM model may use optimizing parameters from an EM technique. The technique 400 includes an operation 408 to recompile the plurality of frames using the set of frames with the speech suppressed. Operation 408 may include recompiling the plurality of frames with the speech free set of frames and the remaining frames, or with video extracted from a multimedia file, the multimedia file including the frames of audio data received in operation 402.

The technique 400 may include playing back the recompiled plurality of frames. In an example, the operations of technique 400 are done by a device, such as a mobile device. The plurality of frames may be recorded at the device. In an example, the trained model may use a second plurality of frames, the second plurality of frames including a predetermined second set of frames including speech by the user. In another example, extracting the set of frames includes converting the plurality of frames to a frequency domain file, determining high-energy frames of the frequency domain file, and comparing the high-energy frames to the trained model to determine whether the high-energy frames include speech. The set of frames may correspond to the high-energy frames that are determined to include speech.

Figure 5:
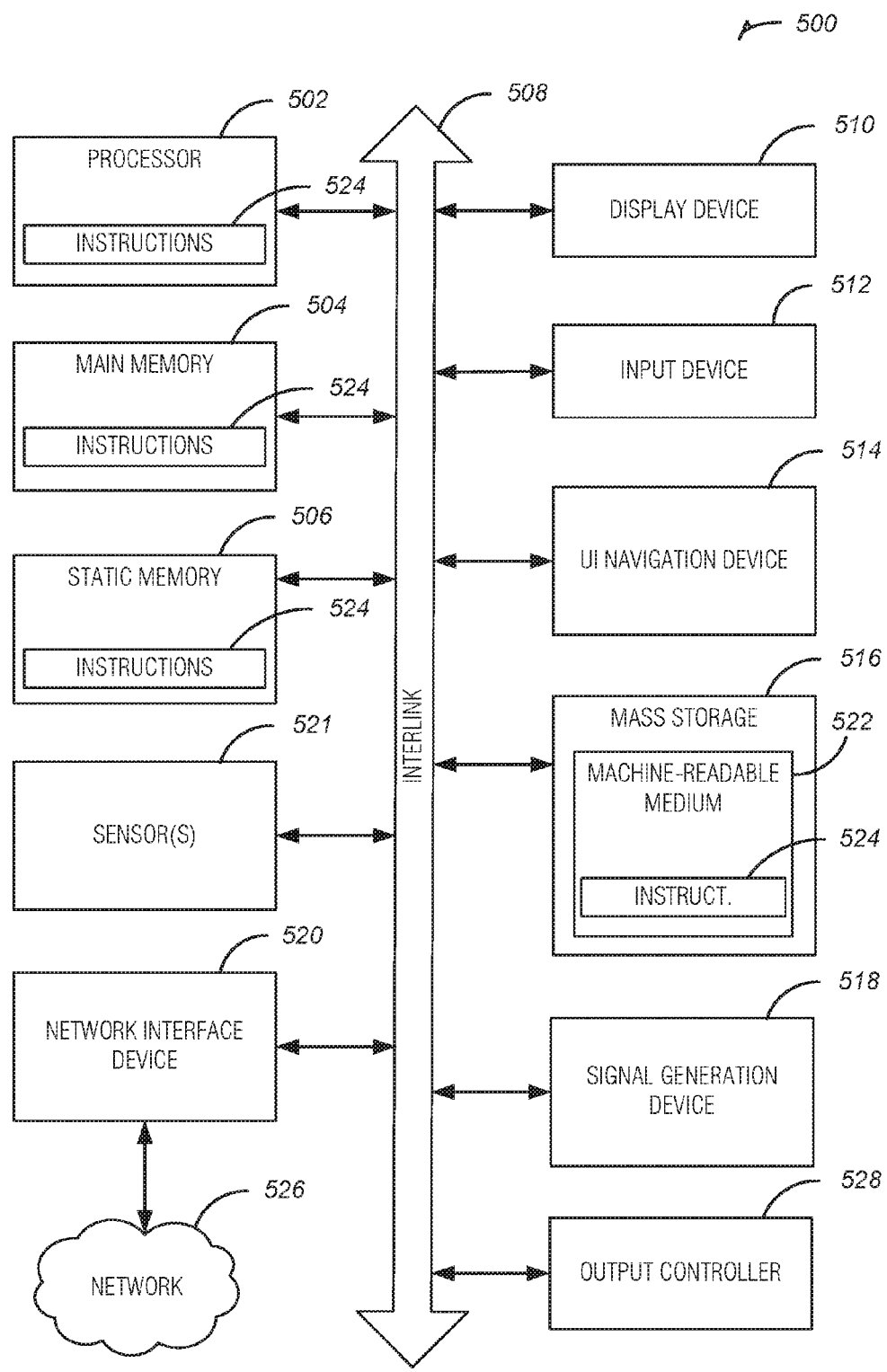
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (hardware) capable of performing specified operations when operating. A module includes hardware. In an example, the hardware may be specifically configured to carry out a specific operation (e.g., hardwired). In an example, the hardware may include configurable execution units e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MEMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a method for removing self-utterances from audio, the method comprising: creating a trained model from a plurality of audio training frames, the plurality of audio training frames including speech by a user during a telephone call at a device; receiving, at a device, a plurality of frames of audio data; extracting, at the device, a set of frames of the plurality of frames, the set of frames including speech by the user with a set of remaining frames in the plurality of frames not in the set of frames; suppressing, at the device, the speech by the user from the set of frames using a trained model to create a speech-suppressed set of frames; and recompiling, at the device, the plurality of frames using the speech-suppressed set of frames and the set of remaining frames.

In Example 2, the subject matter of Example 1 optionally includes, further comprising playing back the recompiled plurality of frames.

In Example 3, the subject matter of any one or more of Examples 1-2 optionally include, wherein the device is a mobile device.

In Example 4, the subject matter of Example 3 optionally includes, wherein the mobile device is a smartphone.

In Example 5, the subject matter of any one or more of Examples 3-4 optionally include, wherein the mobile device is a wearable device.

In Example 6, the subject matter of any one or more of Examples 3-5 optionally include, wherein the mobile device is a laptop device.

In Example 7, the subject matter of any one or more of Examples 1-6 optionally include, further comprising recording the plurality of frames.

In Example 8, the subject matter of any one or more of Examples 1-7 optionally include, wherein suppressing the speech using the trained model includes suppressing the speech using a Gaussian Scale Mixture Model (GSMM).

In Example 9, the subject matter of Example 8 optionally includes, further comprising optimizing parameters of the GSMM using a modified Expectation Maximization (EM) technique.

In Example 10, the subject matter of any one or more of Examples 1-9 optionally include, wherein the plurality of frames of audio data are extracted from a multimedia file.

In Example 11, the subject matter of any one or more of Examples 1-10 optionally include, wherein extracting the set of frames including the speech includes: converting the plurality of frames to a frequency domain file; determining high-energy frames of the frequency domain file; and comparing the high-energy frames to the trained model to determine whether the high-energy frames include speech.

In Example 12, the subject matter of Example 11 optionally includes, wherein the set of frames corresponds to the high-energy frames that are determined to include speech.

In Example 13, the subject matter of any one or more of Examples 1-12 optionally include, wherein the set of remaining frames do not include speech by the user.

In Example 14, the subject matter of any one or more of Examples 1-13 optionally include, further comprising recording the plurality of frames at the device, and wherein recompiling the plurality of frames includes recompiling the frames with self-utterances of the user at the device during recording removed.

Example 15 is at least one machine-readable medium including instructions for operation of a computing system, which when executed by a machine, cause the machine to perform operations of any of the methods of Examples 1-14.

Example 16 is an apparatus comprising means for performing any of the methods of Examples 1-14.

Example 17 is a device for removing self-utterances from audio, the device comprising: a microphone to record a plurality of frames of audio data; processing circuitry to: create a trained model from a plurality of audio training frames, the plurality of audio training frames including speech by a user during a telephone call at a device; extract, at the device, a set of frames of the plurality of frames, the set of frames including speech by the user with a set of remaining frames in the plurality of frames not in the set of frames; suppress the speech by the user from the set of frames using a trained model to create a speech-suppressed set of frames; and recompile, at the device, the plurality of frames using the speech-suppressed set of frames and the set of remaining frames.

In Example 18, the subject matter of Example 17 optionally includes, further comprising a speaker to play back the recompiled plurality of frames.

In Example 19, the subject matter of any one or more of Examples 17-18 optionally include, wherein the device is a mobile device.

In Example 20, the subject matter of Example 19 optionally includes, wherein the mobile device is a smartphone.

In Example 21, the subject matter of any one or more of Examples 19-20 optionally include, wherein the mobile device is a wearable device.

In Example 22, the subject matter of any one or more of Examples 19-21 optionally include, wherein the mobile device is a laptop device.

In Example 23, the subject matter of any one or more of Examples 17-22 optionally include, wherein to suppress the speech using the trained model includes to suppress the speech using a Gaussian Scale Mixture Model (GSMM).

In Example 24, the subject matter of Example 23 optionally includes, wherein parameters of the GSMM are optimized using a modified Expectation Maximization (EM) technique.

In Example 25, the subject matter of any one or more of Examples 17-24 optionally include, wherein the plurality of frames of audio data are extracted from a multimedia file.

In Example 26, the subject matter of any one or more of Examples 17-25 optionally include, wherein to extract the set of frames including the speech, the processing circuitry is to: convert the plurality of frames to a frequency domain file; determine high-energy frames of the frequency domain file; and compare the high-energy frames to the trained model to determine whether the high-energy frames include speech.

In Example 27, the subject matter of Example 26 optionally includes, wherein the set of frames corresponds to the high-energy frames that are determined to include speech.

In Example 28, the subject matter of any one or more of Examples 17-27 optionally include, wherein the set of remaining frames do not include speech by the user.

In Example 29, the subject matter of any one or more of Examples 17-28 optionally include, wherein to recompile the plurality of frames, the processing circuitry is to recompile the frames with self-utterances of the user at the device during recording removed.

Example 30 is at least one machine readable medium including instructions that, when executed, cause the machine to: create a trained model from a plurality of audio training frames, the plurality of audio training frames including speech by a user during a telephone call at a device; receive, at a device, a plurality of frames of audio data; extract, at the device, a set of frames of the plurality of frames, the set of frames including speech by the user with a set of remaining frames in the plurality of frames not in the set of frames; suppress, at the device, the speech by the user from the set of frames using a trained model to create a speech-suppressed set of frames; and recompile, at the device, the plurality of frames using the speech-suppressed set of frames and the set of remaining frames.

In Example 31, the subject matter of Example 30 optionally includes, further comprising instructions to play back the recompiled plurality of frames.

In Example 32, the subject matter of any one or more of Examples 30-31 optionally include, wherein the device is a mobile device.

In Example 33, the subject matter of Example 32 optionally includes, wherein the mobile device is a smartphone.

In Example 34, the subject matter of any one or more of Examples 32-33 optionally include, wherein the mobile device is a wearable device.

In Example 35, the subject matter of any one or more of Examples 32-34 optionally include, wherein the mobile device is a laptop device.

In Example 36, the subject matter of any one or more of Examples 30-35 optionally include, further comprising instructions to record the plurality of frames.

In Example 37, the subject matter of any one or more of Examples 30-36 optionally include, wherein the instructions to suppress the speech using the trained model include instructions to suppress the speech using a Gaussian Scale Mixture Model (GSMM).

In Example 38, the subject matter of Example 37 optionally includes, further comprising instructions to optimize parameters of the GSMM using a modified Expectation Maximization (EM) technique.

In Example 39, the subject matter of any one or more of Examples 30-38 optionally include, wherein the plurality of frames of audio data are extracted from a multimedia file.

In Example 40, the subject matter of any one or more of Examples 30-39 optionally include, wherein the instructions to extract the set of frames including the speech include instructions to: convert the plurality of frames to a frequency domain file; determine high-energy frames of the frequency domain file; and compare the high-energy frames to the trained model to determine whether the high-energy frames include speech.

In Example 41, the subject matter of Example 40 optionally includes, wherein the set of frames corresponds to the high-energy frames that are determined to include speech.

In Example 42, the subject matter of any one or more of Examples 30-41 optionally include, wherein the set of remaining frames do not include speech by the user.

In Example 43, the subject matter of any one or more of Examples 30-42 optionally include, further comprising instructions to record the plurality of frames at the device, and wherein the instructions to recompile the plurality of frames include instructions to recompile the frames with self-utterances of the user at the device during recording removed.

Example 44 is an apparatus for removing self-utterances from audio, the apparatus comprising: means for creating a trained model from a plurality of audio training frames, the plurality of audio training frames including speech by a user during a telephone call at a device; means for receiving, at a device, a plurality of frames of audio data; means for extracting, at the device, a set of frames of the plurality of frames, the set of frames including speech by the user with a set of remaining frames in the plurality of frames not in the set of frames; means for suppressing, at the device, the speech by the user from the set of frames using a trained model to create a speech-suppressed set of frames; and means for recompiling, at the device, the plurality of frames using the speech-suppressed set of frames and the set of remaining frames.

In Example 45, the subject matter of Example 44 optionally includes, further comprising means for playing back the recompiled plurality of frames.

In Example 46, the subject matter of any one or more of Examples 44-45 optionally include, wherein the device is a mobile device.

In Example 47, the subject matter of Example 46 optionally includes, wherein the mobile device is a smartphone.

In Example 48, the subject matter of any one or more of Examples 46-47 optionally include, wherein the mobile device is a wearable device.

In Example 49, the subject matter of any one or more of Examples 46-48 optionally include, wherein the mobile device is a laptop device.

In Example 50, the subject matter of any one or more of Examples 44-49 optionally include, further comprising means for recording the plurality of frames.

In Example 51, the subject matter of any one or more of Examples 44-50 optionally include, wherein the means for suppressing the speech using the trained model include means for suppressing the speech using a Gaussian Scale Mixture Model (GSMM).

In Example 52, the subject matter of Example 51 optionally includes, further comprising means for optimizing parameters of the GSMM using a modified Expectation Maximization (EM) technique.

In Example 53, the subject matter of any one or more of Examples 44-52 optionally include, wherein the plurality of frames of audio data are extracted from a multimedia file.

In Example 54, the subject matter of any one or more of Examples 44-53 optionally include, wherein the means for extracting the set of frames including the speech include: means for converting the plurality of frames to a frequency domain file; means for determining high-energy frames of the frequency domain file; and means for comparing the high-energy frames to the trained model to determine whether the high-energy frames include speech.

In Example 55, the subject matter of Example 54 optionally includes, wherein the set of frames corresponds to the high-energy frames that are determined to include speech.

In Example 56, the subject matter of any one or more of Examples 44-55 optionally include, wherein the set of remaining frames do not include speech by the user.

In Example 57, the subject matter of any one or more of Examples 44-56 optionally include, further comprising means for recording the plurality of frames at the device, and wherein the means for recompiling the plurality of frames include means for recompiling the frames with self-utterances of the user at the device during recording removed.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAM), read only memories (ROMs), and the like.

What is claimed is:

1. A device for removing self-utterances from audio, the device comprising:
   a microphone to record a plurality of frames of audio data;
   processing circuitry to:
   create a trained model from a plurality of audio training frames, the plurality of audio training frames including speech by a user during a telephone call at a device, wherein the trained model includes using a Gaussian Scale Mixture Model (GSMM) with parameters optimized with a learning algorithm using a modified Expectation Maximization (EM) technique and wherein the learning algorithm is scheduled to stall when the learning rate of the EM technique stabilizes;

extract, at the device, a set of frames of the plurality of frames, the set of frames including speech by the user with a set of remaining frames in the plurality of frames not in the set of frames;

suppress the speech by the user from the set of frames using the trained model to create a speech-suppressed set of frames; and recompile, at the device, the plurality of frames using the speech-suppressed set of frames and the set of remaining frames.

2. The device claim 1, further comprising a speaker to play back the recompiled plurality of frames.

3. The device of claim 1, wherein the device is a mobile device.

4. The device of claim 1, wherein the plurality of frames of audio data are extracted from a multimedia file.

5. The device of claim 1, wherein to extract the set of frames including the speech, the processing circuitry is to:
convert the plurality of frames to a frequency domain file;
determine high-energy frames of the frequency domain file; and
compare the high-energy frames to the trained model to determine whether the high-energy frames include speech.

6. The device of claim 5, wherein the set of frames corresponds to the high-energy frames that are determined to include speech.

7. At least one non-transitory machine readable medium including instructions that, when executed, cause the machine to:
create a trained model from a plurality of audio training frames, the plurality of audio training frames including speech by a user during a telephone call at a device, wherein the trained model includes using a Gaussian Scale Mixture Model (GSMM) with parameters optimized with a learning algorithm using a modified Expectation Maximization (EM) technique and wherein the learning algorithm is scheduled to stall when the learning rate of the EM technique stabilizes;
receive, at a device, a plurality of frames of audio data;
extract, at the device, a set of frames of the plurality of frames, the set of frames including speech by the user with a set of remaining frames in the plurality of frames not in the set of frames;
suppress, at the device, the speech by the user from the set of frames using the trained model to create a speech-suppressed set of frames; and
recompile, at the device, the plurality of frames using the speech-suppressed set of frames and the set of remaining frames.

8. The at least one non-transitory machine readable medium of claim 7, further comprising instructions to play back the recompiled plurality of frames.

9. The at least one non-transitory machine readable medium of claim 7, wherein the device is a mobile device.

10. The at least one non-transitory machine readable medium of claim 7, further comprising instructions to record the plurality of frames.

11. A method for removing self-utterances from audio, the method comprising:
creating a trained model from a plurality of audio training frames, the plurality of audio training frames including speech by a user during a telephone call at a device, wherein the trained model includes using a Gaussian Scale Mixture Model (GSMM) with parameters optimized with a learning algorithm using a modified Expectation Maximization (EM) technique and wherein the learning algorithm is scheduled to stall when the learning rate of the EM technique stabilizes;
receiving, at the device, a plurality of frames of audio data;
extracting, at the device, a set of frames of the plurality of frames, the set of frames including speech by the user with a set of remaining frames in the plurality of frames not in the set of frames;
suppressing, at the device, the speech by the user from the set of frames using the trained model to create a speech-suppressed set of frames; and
recompiling, at the device, the plurality of frames using the speech-suppressed set of frames and the set of remaining frames.

12. The method of claim 11, further comprising playing back the recompiled plurality of frames.

13. The method of claim 11, wherein the device is a mobile device.

14. The method of claim 11, further comprising recording the plurality of frames.

15. The method of claim 11, wherein the plurality of frames of audio data are extracted from a multimedia file.

16. The method of claim 11, wherein extracting the set of frames including the speech includes:
converting the plurality of frames to a frequency domain file;
determining high-energy frames of the frequency domain file; and
comparing the high-energy frames to the trained model to determine whether the high-energy frames include speech.

17. The method of claim 16, wherein the set of frames corresponds to the high-energy frames that are determined to include speech.

18. The method of claim 11, wherein the set of remaining frames do not include speech by the user.

19. The method of claim 11, further comprising recording the plurality of frames at the device, and wherein recompiling the plurality of frames includes recompiling the frames with self-utterances of the user at the device during recording removed.

* * * * *

UNITED STATES PATENT AND TRADEMARK OFFICE
CERTIFICATE OF CORRECTION

PATENT NO. : 9,818,427 B2
APPLICATION NO. : 14/977911
DATED : November 14, 2017
INVENTOR(S) : Cahill et al.

Page 1 of 1

It is certified that error appears in the above-identified patent and that said Letters Patent is hereby corrected as shown below:

In the Claims

In Column 13, Line 15, in Claim 2, after "device", insert --of--

Signed and Sealed this
Fourth Day of June, 2019

Andrei Iancu
*Director of the United States Patent and Trademark Office*